July 14, 1942. W. F. BERCK 2,289,869
COUNTING AND INDICATING DEVICE FOR FLUID METERS
Original Filed April 11, 1938 4 Sheets-Sheet 1
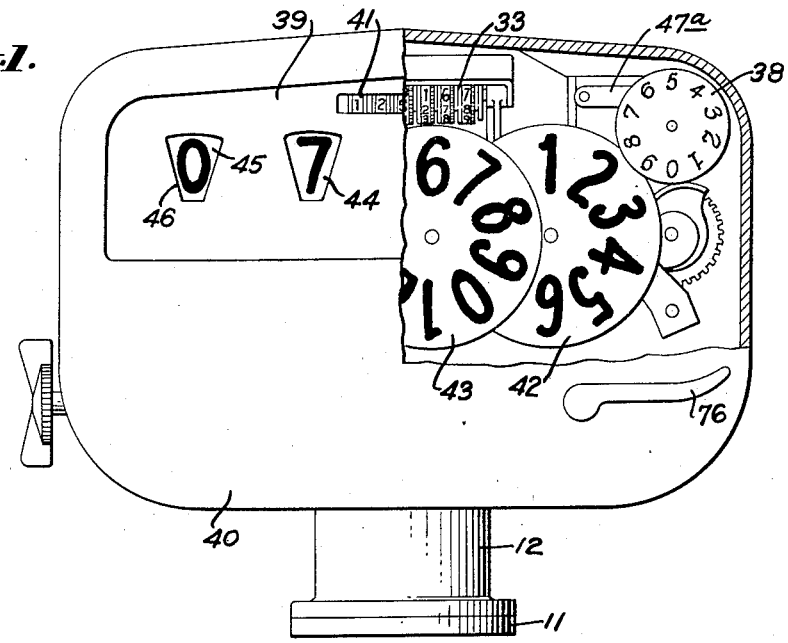
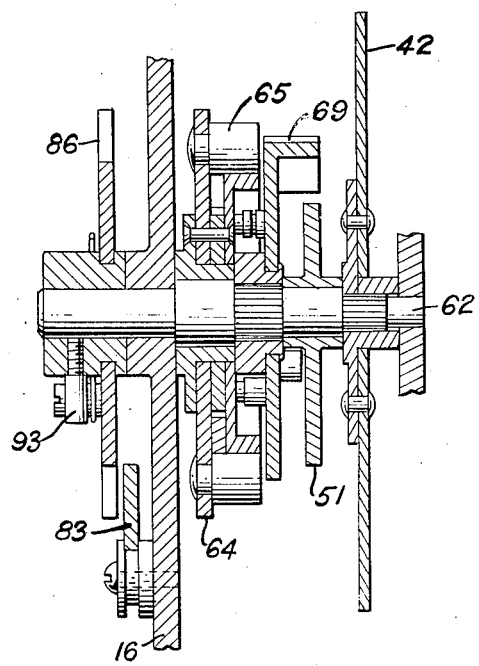
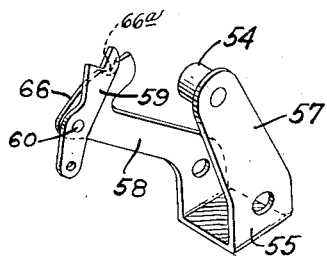
INVENTOR.
William F. Berck
BY
Oscar A. Mellin
ATTORNEY

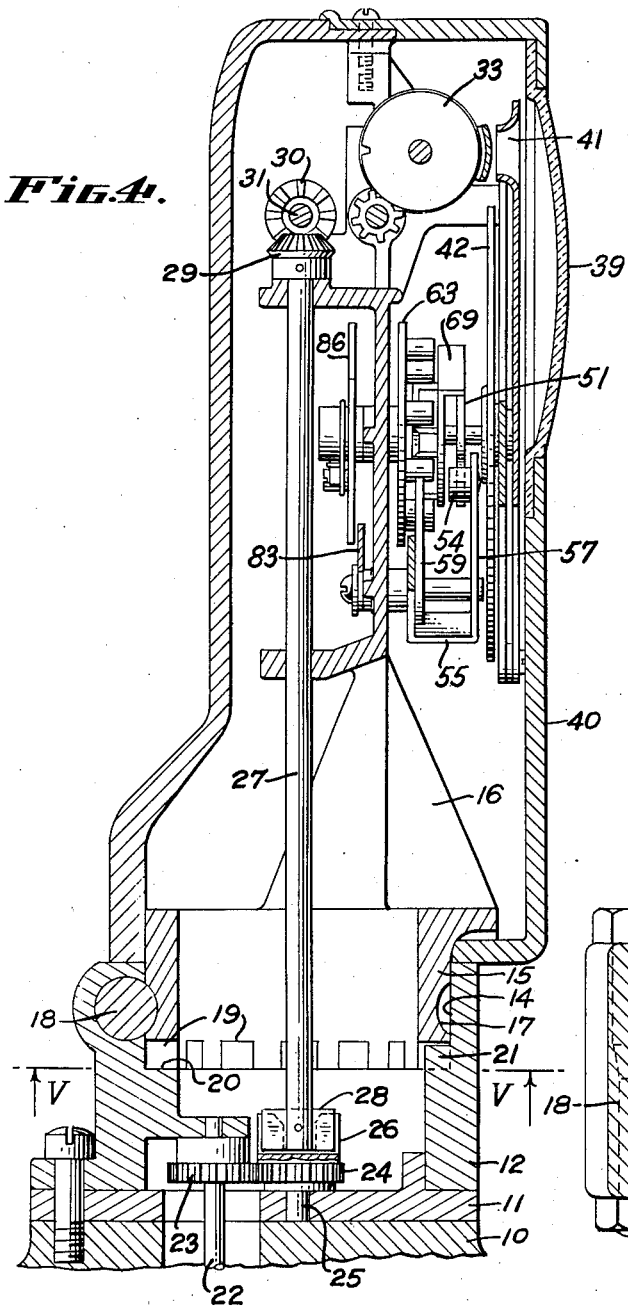
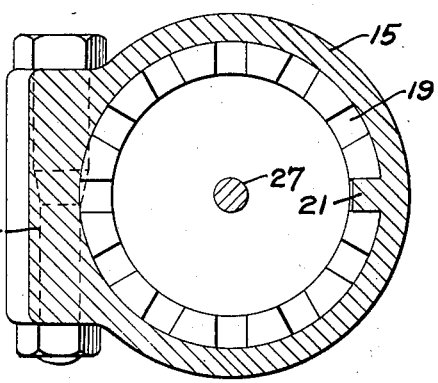

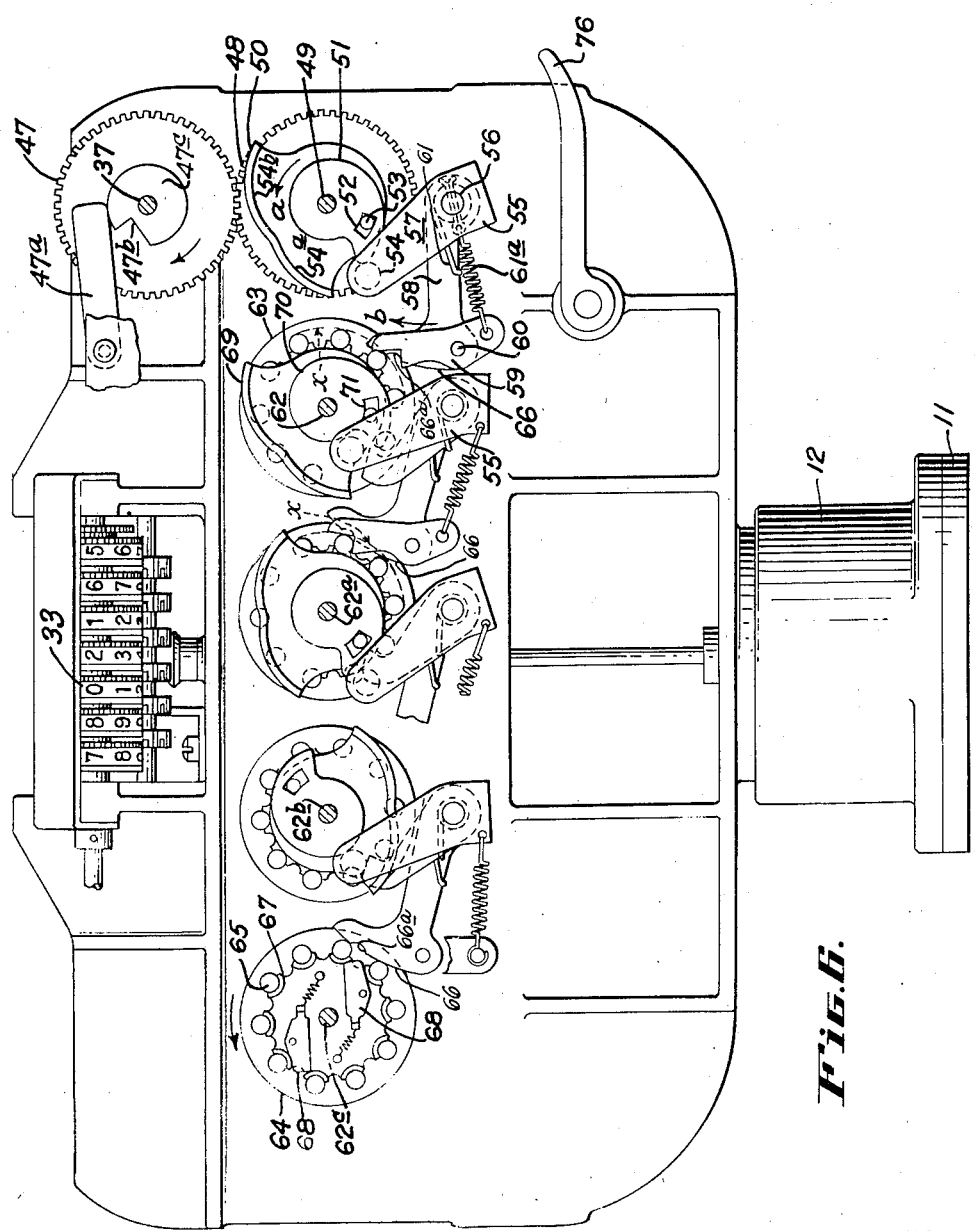

July 14, 1942.  W. F. BERCK  2,289,869
COUNTING AND INDICATING DEVICE FOR FLUID METERS
Original Filed April 11, 1938  4 Sheets-Sheet 4
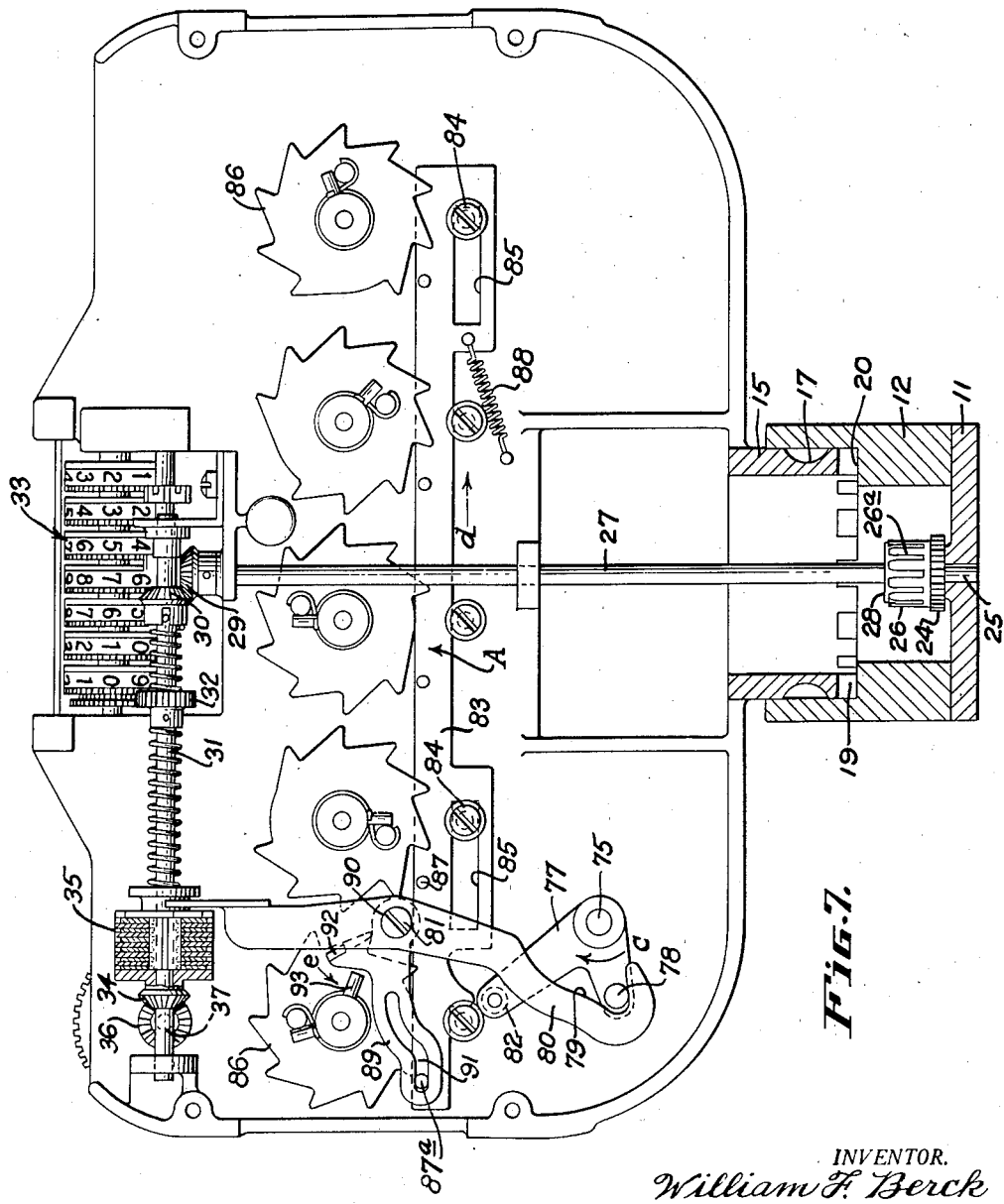
INVENTOR.
William F. Berck
BY
Oscar A. Mellin
ATTORNEY Patented July 14, 1942

2,289,869

UNITED STATES PATENT OFFICE 2,289,869

COUNTING AND INDICATING DEVICE FOR FLUID METERS

William F. Berck, Hayward, Calif., assignor to Ralph N. Brodie Company, Oakland, Calif., a corporation of California Continuation of application Serial No. 201,338, April 11, 1938. This application March 7, 1941, Serial No. 382,236

8 Claims. (Cl. 235—134)

This application is a continuation of my copending application entitled "Counting and indicating device for fluid meters," filed April 11, 1938, Ser. No. 201,338.

This invention relates to counting and indicating devices, particularly counting and indicating devices for use in connection with fluid meters.

It is the principal object of the present invention to provide a generally improved counting and indicating device of the character described capable of being mounted directly upon a meter and capable of angular adjustment with relation to the meter at any time in either direction without affecting the counting mechanism, which device includes a direct figure reading dial in which the change from each displayed figure to the succeeding one is accomplished in a snap movement with the displayed figures remaining stationary in reading position until the instant of change.

One form which the invention may assume is exemplified in the following description and illustrated by way of example in the accompanying drawings, in which:

Fig. 1 is a view in front elevation of a counting and indicating device embodying the preferred form of my invention.

Fig. 2 is an enlarged fragmentary view in section through one of the transfer assemblies constituting a part of the counting and indicating mechanism.

Fig. 3 is a perspective view of the transfer lever, being one of the parts of the transfer mechanism of the counting and indicating mechanism.

Fig. 4 is a view in central vertical section through the counting and indicating device, showing its drive connection with the meter and the manner in which the counting and indicating mechanism may be turned in either direction relative to the meter without in any manner disturbing or affecting the counting mechanism.

Fig. 5 is a transverse sectional view taken along line V—V of Fig. 4.

Fig. 6 is a view in front elevation of the counting and indicating mechanism with the enclosing casing and figure dials removed and other parts broken away so as to more fully disclose certain details of construction.

Fig. 7 is a view in rear elevation with the casing removed and with certain parts shown in central section so as to more fully disclose the construction of the device.

Referring more particularly to the accompanying drawings, 10 indicates the casing of a fluid meter upon which is fixed an adapter plate 11 to which a swivel bearing 12 is secured. The swivel bearing 12 is bored as at 14 to rotatably receive a trunnion 15 formed as an integral part of the frame 16 carrying the counting and indicating mechanism. The trunnion 15 rotatably fits the bore 14 of the swivel bearing 12 and is provided with an external circumscribing groove 17, engaged with which is a bolt 18 extending chord-like through the swivel bearing 12 at one side thereof at a position to engage the groove 17. When the bolt 18 is in position, the trunnion 15 is locked against endwise movement in the bearing 12. This bolt 18 is removable, however, so that it may be extracted to release the trunnion 15 so that the latter may be moved axially upward with respect to the swivel bearing 12.

To normally hold the trunnion 15 from rotating in the swivel bearing 12, the lower end of the former is provided with a series of radial slots 19 in its lowermost end. These slots are spaced equal distances apart circumferentially of the lower end of the trunnion 15, and one of them (depending upon the angular position of the assembly) is adapted to be engaged by a latch lug 21 projecting upwardly from an internal annular shoulder 20 at the lower end of the bore 14 and against which the lower end of the trunnion 15 abuts. Such engagement of one of the slots 19 with the latch lug 21 holds the trunnion 15 against rotation with respect to the swivel bearing 12 and the meter. However, by withdrawing the bolt 18, the trunnion 15 may be moved axially upward with respect to the swivel bearing 12 to disengage the latch lug 21 from the slot 19, enabling the trunnion 15 to be rotated relative to the swivel bearing 12 a desired amount. Thereafter by lowering the trunnion and engaging the lug 21 with one of the slots 19 and again positioning the bolt 18, the trunnion 15 may be again secured in position. Therefore, it is obvious that the position of the counter may be angularly adjusted with respect to the meter.

It is apparent, of course, that the frame 16 which carries the counting and indicating mechanism is preferably an integral part of the trunnion 15 so that when the latter is upraised and turned, the counting and indicating mechanism will be turned simultaneously therewith. This turning or radial adjustment of the counting and indicating mechanism on the meter is accomplished without affecting the counting mechanism.

This is accomplished by providing a shaft 22 (see Fig. 4) which is driven by the meter and which is journaled in its upper end in the swivel bearing 12 and is provided with a spur gear 23. This latter gear is in mesh with a similar gear 24 secured on a stub shaft 25 journaled in the adapter plate 11 and held against axial movement relative to the meter casing 10. At its upper end this gear 24 is provided with a relatively fixed spline clutch part 26 provided with axially extending radial slots 26a extending downwardly from its upper end. In the present instance I have shown the number of slots 26a in the clutch member 26 as agreeing with the number of slots 19. The upper ends of the slots are enlarged as illustrated in Fig. 7 to facilitate engagement of the complementary clutch part 28 fixed at the end of the counting mechanism drive shaft 27. This shaft is journalled in the frame 16 and is arranged vertically and in axial alignment with the stub shaft 25. The lower end of this shaft is fitted with the flat transverse fixed clutch member 28 which will engage the slots 26a when the lower end of the shaft 27 is projected endwise into the spline clutch part 26. However, when the frame 16 is elevated, as previously described for turning, the fixed clutch member 28 disengages from the slots 26a of the spline clutch part 26 so that the entire counting mechanism may be turned with respect to the meter, without imparting any turning movement of the shaft 27 and consequently not affecting the counting mechanism.

The upper end of the counting mechanism drive shaft 27 is fitted with a fixed bevel gear 29 which is in mesh with a similar bevel gear 30 secured from rotation on a secondary drive shaft 31 extending at right angles to the drive shaft 27. Also secured on this secondary drive shaft 31 is a gear 32 which transmits a drive to a totalizing counting mechanism 33 mounted on the frame 16 as illustrated. This totalizing counting mechanism 33 is of standard design and it is sufficient to say that the driving connection between the secondary drive shaft 31 and the units wheel of the counting mechanism 33 is a ten to one ratio, so that the shaft 31 will revolve ten revolutions to each complete revolution of the units wheel of the totalizing counting mechanism 33, thereby operating the totalizer counting mechanism in synchronism with the counting mechanism to be described.

Rotatably mounted on the secondary drive shaft 31 is a bevel gear 34 which is connected for rotation to the shaft 31 by means of a normally engaged clutch 35. When this clutch is engaged, the gear 34 is clutched to the shaft 31 and is driven thereby. The gear 34 is in mesh with a similar gear 36 on a fraction wheel shaft 37 carried by the frame 16 and disposed at right angles to the shaft 31. Secured on this shaft is a fraction dial wheel 38 which lies in a plane parallel to the face plate 39 of the casing 40 which encloses the indicating and counting mechanism. It will be noticed that this casing is made in two parts and is secured to the frame 16 in a manner fully enclosing the mechanism of the counting and indicating device here disclosed.

The face plate 39 is provided with a window 41 through which the dial wheels of the totalizing counting mechanism 33 may be read, and with a window through which the correct figure of the fraction dial wheel 38 may be read.

It should be pointed out here that there are four additional dial wheels for indicating the quantity of fluid passing through the meter. Of these wheels 42 is the units dial wheel, 43 the tens dial wheel, 44 the hundreds dial wheel and 45 the thousands dial wheel. The face plate 39 has a window 46 for each of the dial wheels 42 to 45 inclusive, and of a size and position enabling only the proper figure on said dial wheels to be exposed. These are arranged in a direct horizontal line as illustrated so that the dial of the device here disclosed is a direct reading dial showing the quantity of fluid delivered by the meter at any one operation in units and fractions thereof, the fractions being in tenths as indicated by the fraction dial wheel 38.

To drive the dial wheels, the fraction wheel shaft is fitted with a spur gear 47 which meshes with a similar spur gear 48 on a countershaft 49, which shaft is likewise journalled in the frame 16. Relatively fixed to the gear 48 is a safety cam 50, (see Fig. 6), the function of which will be hereinafter described. Free on the shaft 49 is a snail cam 51 which has an eccentrically positioned arcuate slot 52 formed therein through which a pin 53 fixed to the cam 50 projects. The arcuate length of the slot 52 is slightly greater than the diameter of the pin 53 so that the cam 51 can advance slightly, under certain conditions, with respect to the pin 53. The snail cam 51 is driven in the direction of the arrow $a$ in Fig. 6. Engaging the surface of the cam 51 is a roller 54 mounted on a transfer lever 55 which is best illustrated in Fig. 3. This lever is pivoted on a fixed pin 56 carried by the frame as shown in Figs. 4 and 6, and is constantly urged, by a spring 61, to contact its roller 54 with the snail cam 51. The transfer lever 55 is U-shaped, one arm 57 carrying the roller 54, the other arm 58 carrying a pivotal pawl 59 pivoted to the arm as at 60.

The transfer lever 55, including its arms 57 and 58, which extend at a relatively acute angle to each other, is a one-piece lever both as to structure and as to function and, in its entirety, said arms extend only to one side of its pivot or fulcrum 56. The transfer pawl 59 is mounted on one free end of said lever and the actuating power of the spring 61, which lifts said lever to effect a transfer, is applied thereto between said free end and the fulcrum through the hook engagement of said spring with the lower edge of the lever arm 58, as shown in Fig. 6.

By employing a transfer lever of this character I am enabled to provide a very compact mechanism which permits the indicating dial wheels to overlap to an appreciable extent whereby it becomes possible to position the face plate windows closely adjacent each other so as to produce a more readily readable visual indication of the quantity of fluid dispensed.

It will be understood that, as the cam 51 is rotated to the position shown in Fig. 6, the transfer lever 55 will be normalized and its power spring 61 will be fully tensioned, and that a further rotation of the cam will free the roller of restraint so that the tensioned power spring 61 may elevate the transfer lever to effect a transfer. In ordinary snail cam mechanism of this general type where such cam is fixed to its drive shaft the roller would start a gradual drop as the step of the cam passes the center of the roller and would not free such roller until the step completely passes the entire roller.

Since it is not desired to shield or mask the indicating numerals of the dial wheels during the transfer operations and as it is not desirable that a customer observe a slow transfer movement of such dial wheels, means have been provided whereby a substantially instantaneous snap transfer movement is effected. Such means comprises a pin and slot connection between the cam and its drive, which connection will permit a snap independent advance of the cam as soon as its high point passes the center of the roller.

It is seen that when the roller 54 reaches the high point of the snail cam 51, and as soon as such high point passes the axis of said roller, the force of the spring 61 will cause the cam to advance slightly relative to the pin 53, due to the cam action of the roller 54 with the high corner of the step of the cam, so that the roller 54 will snap to the low point of the cam. When this is done, the arm 58 of the lever 55 will swing in the direction of the arrow *b* in Fig. 6. This movement of the arm 58 through the pawl 59 is translated into a one-tenth revolution of the units dial wheel shaft 62 through the medium of a ratchet wheel 63 freely mounted on the units dial wheel shaft 62. This ratchet wheel comprises a disc 64 on which are mounted ten fixed pins 65 arranged on a circle at equal distances apart and which project axially from the disc so as to be engaged both by the pawl 59 on the arm 58 and under certain conditions, as will be described, by the concentric surface 66 at the end of the arm 58. In this regard it is seen that when it is swung in the direction of the arrow *b*, Fig. 6, a spring 61a will hold the upper notched end of the pawl 59 into engagement with the proper pin 65 of the ratchet wheel 63, and as this arm moves in the direction of the arrow *b*, the pawl will impart one-tenth of a revolution to the ratchet wheel 63 due to this movement of the pawl 59. At the same time the concentric surface 66 of the outer end of the lever 58 will position itself so that the succeeding pin can travel no further than one-tenth of a revolution due to its engagement with this concentric surface 66 on the end of the arm 58 of the transfer lever 55, as illustrated in Fig. 6 with respect to the tens wheel.

This arresting of the rotation of the ratchet wheel 63 at the end of each one-tenth revolution thereof during each transfer operation is effected by reason of the fact that the concentric edge 66 of the arm 58, during its movement, intersects the circular path *x* of travel of the outer surfaces of the several ratchet wheel pins 65, as indicated in Fig. 6. It will be noted that the concentric edge 66 has a semi-circular clearance notch 66a which is disposed to align with the pin engaging step of the transfer pawl 59. In a transfer operation, as the pawl 59 picks up the adjacent ratchet wheel pin 65, the notch 66a of the arm 58 affords clearance for said pin to permit the one-tenth transfer rotation of the ratchet wheel 63, and, as this transfer is being effected, the next succeeding pin 65 comes around to engage an unnotched portion of the concentric edge 66, as shown with respect to the adjacent tens wheel, to prevent an overthrow of said ratchet wheel. A transfer between the units and tens wheels, the tens and hundreds wheels and between the hundreds and thousands wheels will be effected in like manner by similar transfer mechanisms.

Secured on the disc 64 of the ratchet wheel 63 within the pins 65 are fixed ratchet teeth 67, which cooperate with pivotal pawls 68 pivoted to a safety cam 69 (exactly alike in construction to the safety cam 50) secured on the units dial wheel shaft 62. A snail cam 70 (exactly like the snail cam 51 on the shaft 49) is operatively connected to the safety cam 69 through the medium of a pin and slot 71 exactly in the manner that the snail cam 51 is connected to the safety cam 50 on the shaft 49. The units dial wheel 42 is also secured on the shaft 62. It is obvious from this construction that when the ratchet wheel 63 is turned, it will, through the ratchet teeth 67 and the pawls 68, revolve the safety cam 69 and the snail cam 70 together with the dial wheel in unison.

It should be pointed out that the dial wheel assemblies on the units dial wheel shaft 62, the tens, hundreds and thousands wheel shafts 62a, 62b and 62c are exactly the same as that just described, except that on the shaft 62c, the thousands wheel shaft, there is no necessity for the use of a snail cam such as 70. It will also be noticed that the dimensions between the shafts 62, 62a, 62b and 62c is such that the dial wheels thereon overlap for the sake of compactness, without at all interfering with the display of the numbers thereon. It should be stated that transfer between the units wheel shaft 62 and the tens wheel shaft 62a, and the transfer between the tens wheel shaft 62a and the hundreds wheel shaft 62b, and between the latter and the thousands wheel shaft 62c, is effected in exactly the same manner as the previous transfer between the shaft 49 and the units wheel shaft 62.

From the foregoing it is obvious that each time the fraction wheel shaft 37 completes one revolution, that the shaft 49 will complete one revolution. The setting of the snail cam 51 thereon is such that each time the fraction dial wheel comes to zero position, it will, through the transfer arm 57 and the ratchet wheel 63, impart one-tenth of a revolution to the units dial wheel. It is apparent that the change from one figure of the dial wheel to the succeeding figure will be done in a snap movement and not in a gradual one as in prior devices. It is also apparent that the relative settings of the dials on the shafts 62, 62a, 62b and 62c and transfer mechanisms on the shafts is such that each time the units dial wheel reaches the zero position, that the tens dial wheel will be advanced one digit or one-tenth of a revolution. Similarly when the tens dial wheel reaches a zero position, the hundreds dial wheel will be advanced one digit, and when the hundreds dial wheel reaches zero position, the thousands dial wheel will be advanced one digit. Therefore, the figures displayed on the main dial through the windows 46 and the window through which the fraction dial wheel is disposed will indicate in units and fractions thereof the quantity of fluid passed through the meter during any particular operation. At the same time the accumulative or totalizing counter 33 will indicate through the window 41 the total quantity of fluid passed through the meter.

The safety cam 50 on the shaft 49 and the safety cams 69 on the dial wheel shafts perform the same function, which is to insure that the roller 54 on the transfer arm 55 will be brought to the low point of the cam at high speeds during normal operation. This is accomplished by the first lobe 54a of the cam. The second lobe, or that indicated by 54b, of the cam so cooperates with the roller 54 as to insure that the latter is at the low point of the cam when zero position is reached.

I have provided means to expeditiously reset all of the dial wheels to zero. I accomplish this by providing a reset shaft 75 which is supported by the frame 16 in parallelism to the dial wheel shafts. At the outside of the casing 40 this shaft is fitted with an operating lever 76 which may be oscillated to oscillate the shaft 75 and effect the resetting as will be described. Interiorly of the casing and at the rear side of the frame 16 the shaft 75 is fitted with a bell crank lever 77, one leg of which has a cam pin 78 engaging a cam surface 79 on a clutch operating lever 80. This latter is centrally pivoted as at 81 to the frame 16. The end of the lever opposite the cam face 79 is connected with the clutch 35 on the shaft 31 so that swinging movement of the lever in one direction will disengage the clutch and thereby disengage the drive between the shaft 31 and the fraction wheel shaft 37. It is seen that movement of the shaft 75 in the direction of the arrow c, in Fig. 7, will cause the pin 78 to engage the cam surface 79 and swing the lever in a direction disengaging the clutch 35.

As soon as the clutch is disengaged, a pin 82 on the other leg of the bell crank lever 77 will engage a reciprocable reset slide 83, and move the same in the direction of the arrow d, in Fig. 7, the latter being guided for reciprocable movement longitudinally of the frame 16 by means of pins 84 fixed to the frame, and being slidingly engaged in slots 85 in the slide 83.

At the rear side of the frame 16 each dial wheel shaft and the shaft 49 is provided with a reset ratchet wheel 86 provided with nine teeth spaced 36 degrees apart so that one space is twice the length of the others corresponding to the motion of one tooth, this space corresponding with the zero figure on the dial, the other teeth each corresponding to one digit on the dial.

Fixed on the slide 83 in operative relation to each of the reset ratchet wheels is a laterally extending pin 87, as illustrated in Fig. 7 (the pin for the fraction wheel reset ratchet being specifically designated by the reference numeral 87a), so that when the slide is moved by operation of the lever and against the action of the spring 88 these pins will engage the tooth of the adjacent ratchet wheel in its path and move the ratchet wheel one-tenth of a revolution. On the return stroke of the slide, the succeeding teeth of the ratchets will be in the path of the pins 87 and to permit the pins to pass, it is necessary to retrograde the ratchets a slight amount, which is permitted by the flexible driving connection between the ratchets and the dial wheel and the shaft 49, but immediately that the pins have passed the obstructing teeth, the flexible connection between the ratchets and the shafts cause the ratchets to assume the position to which they were set by the pins. Consequently each time the reset shaft 75 is turned in the direction as just described, the clutch 35 will be released and the ratchet wheels will be turned one-tenth of a revolution by the pins 87 until all the ratchet wheels are positioned with the double space in the path of the pins 87, at which time the pins will be ineffective in turning the ratchet wheels and all of the dials will appear at zero.

I also want to point out that during the first operation of the resetting shaft, that the fraction wheel 38 will be turned to zero due to the drive connection between the shaft 49 and the fraction wheel shaft 37. To insure absolute accuracy in placing the fraction dial wheel 38 at zero position, I have provided a pivotal latch 47a which is adapted to engage a notch 47b in the hub 47c of the fraction dial wheel 38. This insures that the fraction wheel will be reset to exactly zero position.

As viewed in Fig. 7, the snap step-by-step adding rotation of the ratchet wheels 86 of the units, tens, hundreds and thousands indicating dials will be in a clockwise direction while the step-by-step reset rotation thereof to zero will be in a counter-clockwise direction. The adding rotation of the reset ratchet 86 of the fraction indicating dial will be a constant rotation in a clockwise direction and this ratchet will be reset step-by-step in a counter-clockwise direction by the slide 83 whenever a tooth of such ratchet is disposed in the path of movement of the slide pin 87a. In this Fig. 7, the middle or tens reset ratchet wheel is shown in its "zero" position, the thousands ratchet wheel being shown in its "2" position and requiring two increments of reset movement to bring it to "zero" position, the hundreds ratchet wheel being shown in its "4" position and the units ratchet wheel being shown in its "5" position. It will be noted, with respect to the tens ratchet wheel, that the "zero" position aligns the long or "zero" space with the path of travel of the associated pin 87 of the reset slide 83 with the first ratchet tooth at the end of the reset stroke of said pin and the ninth ratchet tooth some distance above said pin, this being the true "zero" position of all of the reset ratchet wheels, including the fractions reset ratchet wheel. Obviously if the adding rotation of any one of such ratchet wheels were constant instead of in one tooth increments, it could assume positions past the "9" position and short of the "zero" position.

The fractions reset ratchet wheel is, in Fig. 7, shown in a position of this character in which said wheel, in its adding rotation, has carried the ninth tooth just above the path of the pin 87a but has not yet brought its first tooth into the range of the reset pin 87a. This position is reached when the reset ratchet wheel has moved in an adding direction somewhat past its "9" position but has not as yet reached its "zero" position. Therefore whenever the fractions ratchet wheel is in the position shown in Fig. 7 or in any position between that position and its true "zero" position, the reset pin 87a will be ineffective to reset said ratchet and it becomes necessary to make additional provisions for advancing said ratchet slightly in an adding direction to bring it and the associated fractions dial to true "zero" position.

Inasmuch as the shaft 49 is driven directly from the meter and at meter speed, the reset ratchet wheel 86 thereof does not advance in tenths of a revolution as do the remainder of the shafts, and consequently it is necessary to provide such additional zeroizing means for setting the fraction dial wheel 38 to zero. For this reason I provide a lever 89 pivoted to the frame as at 90 and having a cam slot 91 therein engaged by the pin 87a, so that when the slide is moved forwardly, the lever 89 is swung about its pivotal point to cause a projection 92 thereon to swing in the direction of the arrow e, in Fig. 7. Secured on the hub of the ratchet wheel 86 on the shaft 49 is a projecting pin 93 which will be engaged by the swinging movement of the projection 92 on the lever 89 in the event that the ratchet 86 is in the position referred to. This engagement will cause the ratchet wheel to be advanced in an adding direction from its intermediate position between nine and zero to directly zero as determined by the latch 47a and the notch 47b.

In operation of the device, it is constructed substantially as described and mounted on a meter in the desired angular position with respect thereto. This angular position can be changed as previously described by simply extracting the bolt 18, elevating the casing and frame 16 until the radial slot 19 normally engaging the lug 21 disengages therefrom and the fixed clutch part 28 disengages from the spline clutch part 26 on the gear 24, then the entire counter assembly may be turned relative to the meter to a desired angular position with respect thereto. Upon lowering the frame and casing, the slot 19 registering with the lug 21 will engage the same and at the same time the fixed clutch part 28 will engage the spline clutch part 26, reestablishing a drive between the counter and the meter. It is obvious that this is accomplished without operating the shaft 27 and consequently without turning any of the dial wheels or in any manner affecting the counting mechanism.

When the meter commences operating, it will drive the shaft 27 which in turn will drive the shaft 31, transmitting a drive to the totalizer counter mechanism 33 and simultaneously to the fraction wheel shaft 37, which, of course, will drive the fraction dial wheel, so that the latter will indicate in its window in fractions the quantity of fluid passing through the meter. As this dial wheel shaft 37 continues to rotate, it will, of course, through the gears 47 and 48, drive the shaft 49 in turn driving the snail cam 51. When the fraction wheel shaft has revolved one complete revolution, the shaft 49 will have revolved one complete revolution, and at this point the cam roller 54 on the transfer arm 57 will pass over the high point of the cam and snap to the low point, as previously described. This, through the means of the transfer arm 57 and the ratchet wheel 63 on the units dial wheel shaft 62, will advance the units dial wheel shaft and dial one-tenth of a revolution, or one digit, on the dial wheel. It will be held from overrunning this position by the concentric surface 66 of the arm 58 of the transfer lever 57 so that the dial wheel will be turned accurately one-tenth of a revolution, and the proper figure thereon displayed in its window 46.

When the units dial wheel and its shaft 62 have revolved one complete revolution, a similar transfer is effected between it and the tens dial wheel and its shaft 62a, and the same operation is further carried out between the tens, hundreds and thousands wheels. This enables me to provide a direct reading dial showing the quantity of liquid passing through the meter during any given operation to be accurately displayed in units and tenths thereof, and it is pointed out that by the means of this mechanism, the dial wheels (excepting the fraction wheel) snap from one digit to the succeeding digit when the transfer is effected, so that the numerals thereon do not recede and appear in slow gradual progression. This obviously provides a dial that can be easily and accurately interpreted.

After the particular operation has been completed and it is desired to reset the dial wheels, including the fraction wheel, to zero for a succeeding operation, it is only necessary to oscillate the lever 76 sufficiently until zero appears in all of the windows of the dial wheels. By oscillating this lever, it is seen that the fraction wheel is turned and held in an exact zero position and that each of the other dial wheels are retrograded to zero position in an expeditious fashion, but without affecting the operation of the totalizer counter.

The resetting is accomplished by reciprocating the slide 83 as previously described, which engages ratchet wheels mounted on the dial wheel shafts. When zero position is reached by the dials, the slide 83 is ineffective to impart further turning to the dials.

From the foregoing it is obvious that I have provided a very simple and efficient mechanism which is accurate and positive in operation, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a counting device, a transfer mechanism including a first and a second shaft arranged in parallelism at a spaced distance apart, a snail cam on the first shaft, a lost motion driving connection between said cam and said shaft enabling said cam to advance in the direction of rotation relative to the shaft, a ratchet wheel on the second shaft, a pivotal transfer lever having two free ends, one free end of said lever being spring-pressed into engagement with said cam, said lost motion connection enabling the free end of said lever engaging the cam to advance the latter relative to its shaft when said free end engages the high point of the cam to enable said free end to snap to the low point of the cam, means at the other free end of said lever engaging said ratchet wheel whereby movement of the other free end of said lever from the high to the low point of the cam will be accompanied by a predetermined amount of fractional rotation of the ratchet wheel.

2. In a counting device, a transfer mechanism including a first and a second shaft arranged in parallelism at a spaced distance apart, a snail cam on the first shaft, a lost motion driving connection between said cam and said shaft enabling said cam to advance slightly in the direction of rotation of the shaft relative to the shaft, the fall from the high point to the low point of said cam being accomplished in substantially zero degrees of rotation, a ratchet wheel on the second shaft, a pivotal transfer lever having two relatively fixed free ends located at an acute angle apart, one free end of said lever being spring-pressed into engagement with said cam, said lost motion connection enabling the free end of said lever engaging the cam to advance the latter relative to its shaft when said free end engages the high point of the cam to enable said free end to snap to the low point of the cam, means on the other free end of said lever engaging said ratchet wheel whereby movement of said lever from the high to the low point of the cam will be accompanied by a predetermined amount of fractional rotation of the ratchet wheel.

3. In a counting device, a transfer mechanism including a first and a second shaft arranged in parallelism at a spaced distance apart, a snail cam mounted on the first shaft, a lost motion driving connection between said cam and said shaft enabling said cam to advance slightly in the direction of rotation relative to the shaft, a ratchet wheel on the second shaft, a pivotal transfer lever having two radially extending arms relatively fixed together and arranged at an acute angle relative to each other, one free end of said lever being spring-pressed into engagement with said cam, said lost motion connection enabling the free end of said lever engaging the cam to advance the latter relative to its shaft when said free end engages the high point of the cam to enable said free end to snap to the low point of the cam, means at the other free end of said lever engaging said ratchet wheel whereby movement of the first free end of the lever from the high to the low point of the cam will be accompanied by movement of the second free end of the lever to actuate said means to impart a predetermined amount of fractional rotation to the ratchet wheel, and means also at the second free end of said lever holding said ratchet wheel from movement beyond said predetermined amount.

4. In a counting device, a transfer mechanism including a first and a second shaft arranged in parallelism at a spaced distance apart, a snail cam mounted on the first shaft, a lost motion driving connection between said cam and said shaft enabling said cam to advance in the direction of rotation relative to the shaft, the fall from the high point to the low point of said cam being accomplished in substantially zero degrees of rotation, a ratchet wheel on said second shaft, a pivotal transfer lever pivoted at a point eccentric to the first shaft and having two relatively fixed arms extending radially, the angle between said arms being acute, the end of one of said arms being spring-pressed into engagement with said cam, said lost motion connection enabling the free end of said lever engaging the cam to advance the latter relative to its shaft when said free end engages the high point of the cam to enable said free end to snap to the low point of the cam, means at the end of the other of said arms engaging said ratchet wheel whereby movement of said lever caused by movement of the first arm from the high to the low point of the cam will be accompanied by a predetermined amount of fractional rotation of the ratchet wheel, and means also at the end of said second arm holding said ratchet wheel from movement beyond said predetermined amount.

5. In a counting device, a transfer mechanism including a first and a second shaft arranged in parallelism at a spaced distance apart, a snail cam on the first shaft, a lost motion driving connection between said cam and said shaft, said driving connection comprising a slot in the cam and a pin carried by the shaft, the length of the slot enabling said cam to advance slightly in the direction of rotation relative to the shaft, a ratchet wheel on the second shaft, a transfer lever having two free ends located at an eccentric point relative to the pivotal point of the lever, the angle between said ends being acute, the first free end of said lever being spring-pressed into engagement with said cam, said lost motion connection enabling the free end of said lever engaging the cam to advance the latter relative to its shaft when said free end engages the high point of the cam to enable said free end to snap to the low point of the cam, a spring-pressed pivotal pawl at the other free end of the lever to engage the ratchet wheel whereby movement of the first free end of the lever from the high to the low point of the cam will be accompanied by a predetermined amount of fractional rotation of said ratchet wheel, and fixed means at the second free end of said lever holding said ratchet wheel from movement beyond said predetermined amount.

6. In a counting device, a transfer mechanism including a first and second shaft arranged in parallelism at a spaced distance apart, a driven snail cam mounted on said first shaft, the fall from the high point to the low point of said cam being accomplished in substantially zero degrees of rotation, the connection between said cam and said shaft enabling said cam to advance slightly relative to said shaft in the direction of rotation, a ratchet wheel on the second shaft, a pivotal transfer lever, said lever having two free ends located at eccentric points relative to its pivotal point, said free ends being angularly spaced at an acute angle, the first free end of said lever being spring-pressed into engagement with the cam, means at the second free end of the lever engaging said ratchet wheel whereby movement of the first free end of the lever from the high to the low point of the cam will be accompanied by a predetermined amount of fractional rotation of the ratchet wheel.

7. In a counting device, a transfer mechanism including a first and second shaft arranged in parallelism at a spaced distance apart, a driven snail cam mounted on said first shaft, the fall from the high point to the low point of said cam being accomplished in substantially zero degrees of rotation, the connection between said cam and said shaft enabling said cam to advance slightly relative to said shaft in the direction of rotation, a ratchet wheel on the second shaft, a pivotal transfer lever, said lever having two free ends located at eccentric points relative to its pivotal point, said free ends being angularly spaced at an acute angle, the first free end of said lever being spring-pressed into engagement with the cam, means at the second free end of the lever engaging said ratchet wheel whereby movement of the first free end of the lever from the high to the low point of the cam will be accompanied by a predetermined amount of fractional rotation of the ratchet wheel, and fixed means at the second free end of said lever for engagement with said ratchet wheel to hold the same from movement beyond said predetermined amount.

8. In a counting device, a transfer mechanism including a first and a second shaft arranged in parallelism at a spaced distance apart, a driven snail cam mounted on said first shaft, the fall from the high point to the low point of said cam being accomplished in substantially zero degrees of rotation, the connection between said cam and said shaft enabling said cam to advance slightly relative to said shaft in the same direction of rotation, a disc mounted on said second shaft and having a plurality of axially extending pins fixed thereto arranged in a concentric cycle at equally spaced distances apart, a transfer lever pivotally mounted at a point eccentric with respect to one of said shafts, said lever having two free ends radially spaced from the pivotal point thereof and located at an acute angle apart, spring means urging the first of said free ends into contact with said cam, said contact resisting said slight advance of said cam, a spring-pressed pawl at the other free end of said lever to engage said pins whereby movement of the first free end of the lever from the high to the low point of the cam will be accompanied by a predetermined amount of fractional rotation of said disc, and means fixed at the second free end of said lever adapted to be moved into position by the aforesaid movement of the lever to engage said pins and prevent said disc from movement beyond said predetermined amount.

WILLIAM F. BERCK.